United States Patent Office 3,282,579
Patented Nov. 1, 1966

3,282,579
REFRACTORY LINING
Eldon D. Miller, Jr., Bridgeville, and Raymond S. Beals, Pittsburgh, Pa., assignors to Harbison-Walker Refractories Company, Pittsburgh, Pa., a corporation of Pennsylvania
No Drawing. Filed Oct. 10, 1962, Ser. No. 229,734
5 Claims. (Cl. 263—46)

This invention relates to improved high temperature refractory linings. In one aspect, it relates to composite high temperature refractory linings having improved physical stability in service.

Desirably, refractory linings have the ability to chemically and physically resist deterioration in their respective service environments. Relative resistance to chemical attack may be provided by judicious selection of refractory ingredients. For example, basic refractory grain is used to fabricate refractory shapes for installation in chemically basic service environments; and non-basic refractory grain is normally used in acid or chemically non-basic environments. Ability to resist physical attack is an entirely different matter. Many physical properties are desirable in a refractory to provide optimum service. These include ability to resist penetration by various metallurgical slags and off gases, ability to resist rapid and drastic cyclic variation in temperature without spalling and cracking, volume stability, i.e. no substantial growth or shrinkage due to mineralogical change in a refractory when exposed to service temperature ranges, etc.

High temperature refractory linings have been suggested which satisfy many of the foregoing chemical and physical requirements. However, relatively improved ability to resist various modes of physical deterioration was usually obtained only with sacrifice of other desired physical and/or chemical properties.

Accordingly, it is an object of this invention to provide improved refractory linings. It is another object of the invention to provide improved refractory shapes for fabrication of high temperature refractory linings. A further object of the invention is to provide an improved non-basic refractory lining. And it is yet another object of the invention to provide an improved high alumina refractory lining, having excellent ability to resist chemical and physical deterioration in service.

Briefly, according to one aspect of the invention, there is provided a highly refractory lining constructed of a plurality of prefabricated composite shapes. It is useable at temperatures up to about 3400° F. The hot face section of these shapes is a high alumina composition having excellent resistance to chemical attack in non-basic or acid environments. It has especially high refractoriness for a high alumina composition, resists corrosion and penetration by the fumes and/or molten slags of non-basic or acid service environments, and is extremely strong, having excellent load-bearing properties. This hot face section is provided with a high alumina back-up section, having particularly good thermal shock resistance and economy of materials. The hot face section and the back-up section are chemically compatible so that, upon firing, they are ceramically bonded to each other over their abutting interfaces to provide a monolithic shape.

The hot face section, upon firing, is mineralogically characterized as a coarse textured, yet dense, and highly impermeable body. Microscopic examination shows relatively coarse textured alumina particles interspersed through a dense matrix of very fine crystalline mullite. The matrix is characterized as having very small and highly dispersed voids. Upon firing, the back-up section is mineralogically characterized as coarse textured, and having large particles of high alumina material relatively loosely bonded in place. The appearance of loose bonding is the result of a rather extensive network of tesselated cracks, which network encompasses a major portion of most of the coarser particles in the back-up section. This network of tesselated cracks appears to provide stress relief for the composite body during cyclic variations in temperature in a service environment. The back-up section is usually made up of material which is less expensive and less pure than that used for the hot face section, since it does not come in contact with the ultimate use temperatures which the hot face portion must resist.

A preferred method of manufacturing a lining according to this invention includes prefabrication of a plurality of composite shapes, designed to form at least a portion of the various parts of a high temperature metallurgical vessel or kiln lining such as the doors, jambs, arches, walls, bottoms, roofs, etc. Preferably, the shapes are made by ramming in molds. Details of manufacture are discussed below in more detail.

The back-up section or portion of composite refractory linings and shapes according to this invention is preferably made from a mixture of calcined aluminum ores, alumina, and a minor amount of a selected plasticizer. A preferred mix is comprised of about 70%, by weight, calcined bauxite, about 15% high purity alumina and about 15% ball clay. The alumina and ball clay are in a fine state of subdivision and preferably substantially all passes a 100 mesh screen. A typical screen analysis for the mixture would be about as follows: about 20% —3 on a 10 mesh screen, about 30% passing a 10 and resting on a 28 mesh screen, with the remainder passing a 28 mesh screen. Of that portion passing a 28 mesh screen, about 40% passes a 65 mesh screen. The size grading, of course, is variable to a limited degree according to the well known size grading practices in the refractory art. However, generally, from 20 to 50% of the total mix rests on a 28 mesh screen, the remainder passing a 28 mesh screen. In fabrication of the mix, the calcined bauxite is so size graded as to fulfill the desired screen analysis when intermixed with the —100 mesh alumina and ball clay plasticizer. A workable range of the plasticizer is from about 5% to about 15%, by weight, of the batch. Finely divided high purity calcined alumina should be present at least in a weight quantity about equal to the —100 plasticizer addition.

The hot face portion is more thermally conductive than the back-up portion. It is made from a refractory batch consisting of, by weight, from at least 1 to not over 10% of substantially pure volatilized silica with a relatively coarse ground high alumina refractory material constituting the remainder of the batch. This alumina material has less than about 1.3%, by weight, of iron oxide and is selected from the group consisting of alumina, calcined aluminum ores, synthetic aluminous grain (such as fused mullite) and mixtures thereof, containing at least about 50% of $Al_2O_3$, by weight (about 50% $Al_2O_3$ connotes "high alumina" refractory material), and on the basis of an oxide analysis. Sometimes it is desirable to adjust the total $Al_2O_3$ content of the batch. For this purpose, crystalline silica, such as potters flint, may be added to the mix. Preferably, no more crystalline silica should be added than that required to adjust the total $Al_2O_3$ content down to about 50%, by weight, of the total batch.

The size grading of this mixture of volatilized silica, coarse ground alumina refractory material and, if desired, crystalline silica, should be about the same as the size grading set forth above for the batch for the back-up portion. A preferred mix for the hot face portion is about 90 parts, by weight, tabular alumina, about 5 parts by weight, of volatilized silica, and about 5 parts, by weight, of potters flint (a crystalline silica).

An important difference between the batch used to fabricate the back-up portion of composite shapes according to this invention and that used to fabricate the hot face portion thereof, is the use of a plasticizer in the former, and volatilized silica in the latter which induces the formation of a fine (sub-micron) crystalline mullite matrix.

Other materials than the calcined bauxite or tabular alumina discussed above may be used in fabricating either of the batches. For example, diasporitic clays, kaolinite, etc., having relatively high alumina contents, may also be used. However, it is essential that the resulting fired portions of the composite shapes have substantially the same characteristics of thermal expansion. If this is not true, the interface ceramic bond may fracture when subjected to cyclic temperature variations. Typical chemical analyses of various commercially available materials, which can be used in fabricating the batches discussed above, are as follows:

Calcined and tabular alumina: Percent
- $Al_2O_3$ ———————————————— 99.4
- $SiO_2$ ———————————————— 0.3
- $Fe_2O_3$ ———————————————— 0.2
- Alkaline earth oxides ———————— 0.1

Calcined burley diaspore:
- $SiO_2$ ———————————————— 21.9
- $Al_2O_3$ ———————————————— 47.1
- $TiO_2$ ———————————————— 2.4
- $Fe_2O_3$ ———————————————— 1.1
- MgO ———————————————— 0.40
- CaO ———————————————— 0.24
- Alkalies ———————————————— 0.56

Calcined Alabama bauxite:
- $SiO_2$ ———————————————— 21.9
- $Al_2O_3$ ———————————————— 74.2
- $TiO_2$ ———————————————— 3.4
- $Fe_2O_3$ ———————————————— 0.8
- CaO ———————————————— 0.04
- MgO ———————————————— 0.05
- Alkalies ———————————————— 0.02

Potter's flint:
- $SiO_2$ ———————————————— 99.7
- $Al_2O_3 + Fe_2O_3 + TiO_2$ ———————— 0.3

Calcined South American bauxite:
- $Al_2O_3$ ———————————————— 88.58
- $SiO_2$ ———————————————— 6.21
- $TiO_2$ ———————————————— 3.37
- $Fe_2O_3$ ———————————————— 1.56

Ball clay:
- $Al_2O_3$ ———————————————— 30.3
- $SiO_2$ ———————————————— 53.6
- $TiO_2$ ———————————————— 1.7
- $Fe_2O_3$ ———————————————— 0.9
- CaO+MgO ———————————————— 0.49
- $Ma_2O + K_2O + Li_2O$ ———————— 0.41
- Ignition loss ———————————————— 12.4

Volatilized silica (calcined):
- $SiO_2$ ———————————————— 98 to 90.
- $Al_2O_3$ ———————————————— .25 to .6.
- $Fe_2O_3$ ———————————————— .6 to 1.5.
- CaO ———————————————— .4 to 2.1.
- MgO ———————————————— .3 to 2.2.
- Alkalies, trace impurities and ignition loss — Remainder (by difference).

Various $Al_2O_3$ contents may be achieved in the foregoing batches by mixing of the various ingredients listed in the table above. For example, a batch having about 50% $Al_2O_3$ by weight, could be made from 85 parts, by weight, calcined burley diaspore and about 15 parts, by weight, tabular alumina. A 72% $Al_2O_3$ batch could include about 65 parts calcined Alabama bauxite and about 26.5% tabular alumina.

Of course, a small amount of tempering fluid is added to the batches to assist in forming. A preferred tempering fluid is a mixture of water and lignin liquor in about a 3 to 1 weight ratio. About 5 parts, by weight, of this mixture based on the total weight of the respective batches should be used to obtain a good ramming consistency.

A preferred method of manufacturing the composite shapes to be used in forming linings according to this invention is as follows: a mold of a desired shape is fabricated. The batch for fabrication of the back-up lining and a separate batch for fabrication of the hot face portion are prepared. A portion of the hot face portion batch is rammed into the mold. Preferably, the hot face portion should extend for about ½ the depth of the mold. While the rammed hot face portion is still moist, the back-up portion batch is rammed into the mold in a quantity sufficient to substantially fill it. The mold is stripped from the rammed shape and the shape is dried and fired in a kiln to a temperature of about 2670° F. on about a 100° F. per hour heating rate. The firing produces a ceramic bond at the interfaces. The temperature is maintained for about 10 hours. The resulting fired composite shapes may then be used to fabricate a refractory lining.

While ramming is a preferred technique for forming the composite shapes of this invention, it is also possible to fabricate them on power pressing equipment. However, power pressing equipment is not entirely satisfactory in forming more complex shapes, such as those to be used in forming arches, door jams, etc. Further, while it is preferred to fabricate a plurality of composite shapes and to use them in building a complete lining, it is possible to form in place a lining according to the invention. In such a situation, molds are placed in a vessel or kiln and the back-up portion and hot face portion, made according to the teachings above, are sequentially rammed in place. The vessel or kiln is then heated to above about 2670° F. according to the heating schedule discussed above.

Further, the back-up portion and hot face portion of my composite shapes may be sequentially cast in a common mold.

In the foregoing discussion, all parts and percentages are by weight; all screen sizing is according to Tyler mesh sizes. All chemical analyses are on the basis of an oxide analysis, in conformity with the common practices of reporting the chemical analysis of refractory materials.

Having thus described the invention in detail and with sufficient particularly as to enable those skilled in the art to practice it, what is desired to have protected by letters patent is set forth in the following claims:

We claim:

1. As at least a part of a high temperature refractory lining, a composite section which includes a back-up portion and a hot face portion, both the back-up portion and the hot face portion being high alumina refractory monolith compositions containing at least about 50% $Al_2O_3$, the back-up portion, upon firing, being mineralogically characterized as coarse textured, and having relatively coarse particles of high alumina refractory material relatively loosely bonded in place, said fired back-up portion being further mineralogically characterized by a network of tesselated cracks, which network encompasses a major portion of most of the coarse alumina particles, said hot face portion, upon firing, being mineralogically characterized as coarse textured, having coarse textured high alumina refractory particles interspersed through a dense, rigid, matrix, said matrix characterized as having very small and highly dispersed voids and the back-up portion and the hot face ceramically bonding to each other over abutting interfaces upon firing of the lining to provide a monolithic construction including both the back portion and the hot face portion.

2. The lining of claim 1 in which the $Al_2O_3$ content of the composite section is substantially entirely provided by material selected from the group consisting of alumina, aluminum ores, synthetic aluminous grain, and mixtures thereof.

3. The lining of claim 1 in which the back-up portion includes 5–15%, by weight, of very finely divided refractory plasticizer material and in which the hot face portion includes 1–10%, by weight, of volatilized silica.

4. The lining of claim 1 in which the hot face portion is made from a batch consisting essentially of 1 to 10 parts, by weight, based on the total weight of the batch of volatilized silica, high alumina refractory material selected from the group consisting essentially of alumina, aluminum ores, synthetic alumina grain and mixtures thereof, and sufficient crystalline silica to adjust the total $Al_2O_3$ content, by weight and on the basis of an oxide analysis, between about 50 and 98%.

5. The lining of claim 1 in which the composite section, upon firing, is characterized by a substantially continuous ceramic bond over the interface of the back-up portion and hot face portion.

References Cited by the Examiner

UNITED STATES PATENTS

| | | | |
|---|---|---|---|
| 2,186,223 | 1/1940 | Willetts | 263—46 |
| 2,480,359 | 8/1949 | Debenham | 262—46 |
| 2,704,419 | 3/1955 | Hewitt et al. | 263—46 |

ALEXANDER WYMAN, *Primary Examiner.*

MORRIS SUSSMAN, *Examiner.*